United States Patent Office 2,914,533
Patented Nov. 24, 1959

2,914,533

TERTIARY-AMINOALKYL N-(PYRIDYL)CARBAMATES AND THEIR PREPARATION

Raymond O. Clinton, North Greenbush Township, N.Y., assignor to Sterling Drug Inc., New York, N.Y., a corporation of Delaware No Drawing. Application November 13, 1956
Serial No. 621,535

5 Claims. (Cl. 260—294.3)

This invention relates to compositions of matter of the class of basic esters of N-substituted-carbamic acids, to their salts, and to the preparation of these compounds.

The invention here resides in a composition of matter comprising the (lower-tertiary-amino)-(polycarbon-lower-alkyl) N-(pyridyl)carbamates and acid addition and quaternary ammonium salts thereof.

Preferred embodiments of my invention in their free base form have the general formula

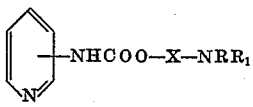

where X is a lower-alkylene radical having from two to four carbon atoms inclusive and having its two free valence bonds on different carbon atoms; NRR₁ is a lower-tertiary-amino radical of which di-(lower-alkyl)-amino, 1-piperidyl, (lower-alkylated)-1-piperidyl, 1-pyrrolidyl, (lower-alkylated)-1-pyrrolidyl, and 4-morpholinyl are illustrative; and the substituent designated as

—NHCOO—X—NRR₁ can be attached to any of the 2-, 3- or 4-positions of the pyridine ring.

Evaluation of the compounds of my invention by standard test procedures has shown that they have useful pharmacodynamic properties, for instance, analgesic, local anesthetic, ganglionic blocking and antifibrillatory activities.

The lower-alkylene radical X has from two to four carbon atoms, and includes such radicals as —CH₂CH₂—, —CH(CH₃)CH₂—,

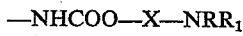

and the like.

The lower-tertiary-amino radical, designated above as NRR₁, comprehends dialkylamino radicals where R and R₁ are lower-alkyl groups, alike or different, and each alkyl group has from one to six carbon atoms, such dialkylamino radicals including dimethylamino, diethylamino, ethylmethylamino, diisopropylamino, ethyl-n-propylamino, di-n-butylamino, di-n-hexylamino, and the like. Further, the lower-tertiary-amino radical designated as NRR₁ encompasses saturated N-heteromonocyclic radicals having five to six ring atoms, illustrated by examples such as 1-piperidyl; (lower-alkylated)-1-piperidyl such as 2-methyl-1-piperidyl, 3-ethyl-1-piperidyl, 4-methyl-1-piperidyl, 2,6-dimethyl-1-piperidyl; 1-pyrrolidyl; (lower-alkylated)-1-pyrrolidyl such as 2-methyl-1-pyrrolidyl, 3-ethyl-1-pyrrolidyl, 2,5-dimethyl-1-pyrrolidyl; 4-morpholinyl; and the like.

The compounds of my invention in free base form were prepared by heating a lower-alkyl N-(pyridyl)-carbamate having the formula

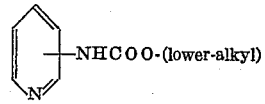

where the lower-alkyl radical has from one to six carbon atoms, with a tertiary-aminoalkanol having the formula HO—X—NRR₁, where X and NRR₁ have the meanings given above. Illustrations of the process of my invention are: the preparation of 2-diethylaminoethyl N-(4-pyridyl)carbamate by heating methyl N-(4-pyridyl)carbamate with 2-diethylaminoethanol; the preparation of 3-(1-piperidyl)propyl N-(3-pyridyl)carbamate by heating ethyl N-(3-pyridyl)carbamate with 3-(1-piperidyl)propanol; the preparation of 2-(2,5-dimethyl-1-pyrrolidyl)ethyl N-(2-pyridyl)carbamate by heating n-propyl N-(2-pyridyl)carbamate with 2-(2,5-dimethyl-1-pyrrolidyl)ethanol; the preparation of 2-(4-morpholinyl)ethyl N-(3-pyridyl)carbamate by heating isobutyl N-(3-pyridyl)carbamate with 2-(4-morpholinyl)ethanol; the preparation of 4-dimethylaminobutyl N-(3-pyridyl)carbamate by heating n-hexyl N-(3-pyridyl)carbamate with 4-dimethylaminobutanol; and the like.

This process of my invention was carried out preferably by heating the reactants in an inert solvent such as xylene and removing, by distillation through a 6-inch vacuum-jacketed Vigreaux column, the alkanol formed by the reaction, e.g., ethanol when an ethyl N-(pyridyl)carbamate is used. The reaction will proceed without removing the alkanol; however, its removal is a convenient way of telling when the reaction is complete. Although I found xylene preferable, other inert solvents well-known to the chemist can be used as the reaction medium. For example, lower boiling solvents such as benzene can be used, however, the reaction time is longer. Higher boiling solvents are operable, although the possibility of lower yields is increased because of undesirable side reactions.

My invention comprehends not only the above-described tertiary-aminoalkyl N-(pyridyl)carbamates in their free base form, but also their acid addition and quaternary ammonium salts.

The acids which can be used to prepare the acid addition salts are preferably those which produce, when combined with the basic ester, salts whose anions are relatively innocuous to the animal organism in therapeutic doses of the salts, so that the beneficial physiological properties inherent in the free base are not vitiated by side effects ascribable to the anions; in other words, the latter do not substantially affect the pharmaco-dynamic properties inherent in the cations. In practicing my invention, I found it convenient to employ the hydrochloride or phosphate salt. However, other appropriate salts within the scope of the invention are those derived from mineral acids such as hydrobromic acid, hydriodic acid, nitric acid, and sulfuric acid; and organic acids such as acetic acid, citric acid, tartaric acid, lactic acid, ethanesulfonic acid, quinic acid, and the like, giving the hydrobromide, hydriodide, nitrate, sulfate, acetate, citrate, tartrate, lactate, ethanesulfonate and quinate, respectively.

Quaternary ammonium salts of my invention are prepared by mixing the free basic ester and the quaternizing agent, preferably in an organic solvent. Heating may be used to facilitate the reaction, although salt formation usually takes place readily at room temperature. The quaternary ammonium salt separates directly or can be obtained by concentration of the solution. Both mono- and di-quaternary ammonium salts have been prepared and both are comprehended by my invention. Preferred types of quaternizing agents include alkyl, alkenyl or aralkyl esters of inorganic acids or organic sulfonic acids, thus including such compounds as methyl chloride, methyl bromide, methyl iodide, ethyl bromide, propyl chloride, allyl chloride, allyl bromide, methyl sulfate, methyl benzenesulfonate, methyl para-toluenesulfonate, benzyl chloride, benzyl bromide, and substituted benzyl halides, such as para-chlorobenzyl chloride, para-nitrobenzyl chloride, ortho-chlorobenzyl chloride, para-methoxybenzyl chloride, and the like, the respective quaternary salts being the methochlorides, methobromides, methiodides, ethobromides, propochlorides, allochlorides, allobromides, methosulfates, methobenzenesulfonates, methopara-toluenesulfonates, benzochlorides, benzobromides, para - chlorobenzochlorides, para - nitrobenzochlorides, ortho-chlorobenzochlorides, and para-methoxybenzochlorides, respectively.

It is also possible to convert one quaternary ammonium salt to another in which the anion is different. If the anion of the quaternary salt forms a water-insoluble silver salt, which is usually the case, the quaternary salt will react with silver oxide in aqueous medium to form the corresponding quaternary ammonium hydroxide. The later can then be neutralized with any desired acid, weak or strong, to produce a new quaternary ammonium salt in which the anion is different from that of the original quaternary salt. In this way quaternary ammonium salts in which the anion is derived from a weak acid can be obtained.

The chemical structure of my tertiary-aminoalkyl N-(pyridyl)carbamates and their salts are established by their mode of synthesis and corroborated by the correspondence of calculated and found values for the elementary analyses for respective examples.

The following examples will further illustrate the invention without, however, limiting it thereto.

EXAMPLE 1

*2-diethylaminoethyl N-(3-pyridyl)carbamate*

A mixture of 16.6 g. of ethyl N-(3-pyridyl)carbamate, 14.1 g. of 2-diethylaminoethanol and 200 ml. of dry xylene was distilled slowly through a 6-inch vacuum-jacketed Vigreaux column until 100 ml. of distillate had been collected, the distillation requiring about two hours. The excess xylene and 2-diethylaminoethanol were removed in vacuo on a steam bath under reduced pressure at 12 mm. The residual oil was dissolved in ethyl acetate; the solution treated with decolorizing charcoal and filtered; and the clear filtrate containing 2-diethylaminoethyl N-(3-pyridyl)carbamate in free base form was treated with an excess of ethereal hydrogen chloride. The solution was diluted with absolute ether and allowed to stand in the cold, whereupon there sepraated a gummy material which crystallized. This product was recrystallized once from isopropanol-acetone and once from anhydrous ethanol to yield the product as rosettes of white needles, 2-diethylaminoethyl N-(3-pyridyl)carbamate dihydrochloride, M.P. 181.5–183.5° C. (corr.).

*Anal.*—Calcd. for $C_{12}H_{19}N_3O_2.2HCl$: C, 46.46; H, 6.82; Cl, 22.86. Found: C, 46.38; H, 6.87; Cl, 22.62.

2-diethylaminoethyl N-(3-pyridyl)carbamate dihydrochloride produced a duration of anesthesia of about six minutes when tested in 1.0% solution by the sciatic nerve block test in guinea pigs as described by Luduena and Hoppe, J. Pharm. & Exptl. Therap. 104, 40 (1952). This compound was found to have anti-fibrillatory activity when tested against ventricular fibrillation in the isolated perfused rabbit heart induced by the injection of calcium chloride [see Grumbach et al., Circulation Research, 2, 452 (1954)].

Other tertiary-aminoalkyl N-(pyridyl)carbamates that can be prepared according to the above procedure used to prepare 2-diethylaminoethyl N-(3-pyridyl)carbamate using the appropriate tertiary-aminoalkanol and lower alkyl N-(pyridyl)carbamate include the following: 2-diethylaminoethyl N-(4-pyridyl)carbamate; 3-(1-piperidyl) propyl N-(3-pyridyl)carbamate; 2-(2,5-dimethyl-1-pyrrolidyl)ethyl N-(2-pyridyl)carbamate; 2-(4-morpholinyl) ethyl N-(3-pyridyl)carbamate; 4-dimethylaminobutyl N-(3-pyridyl)carbamate; 2-(2,6-dimethyl-1-piperidyl)ethyl N-(3-pyridyl)carbamate; 2 - (1 - pyrrolidyl)ethyl N-(3-pyridyl)carbamate; 2 - (di - n - butylamino)ethyl N - (4-pyridyl)carbamate; 2 - diethylamino - 1 - propyl N - (2-pyridyl)carbamate; and the like.

EXAMPLE 2

*2-(2-methyl-1-piperidyl)ethyl N-(3-pyridyl)carbamate*

The preparation of this compound was carried out following the procedure described above for Example 1 using 16.6 g. of ethyl N-(3-pyridyl)carbamate, 14.3 g. of 2-(2-methyl-1-piperidyl)ethanol and 200 ml. of dry xylene. About 16.9 g. of the basic ester, 2-(2-methyl-1-piperidyl)ethyl N-(3-pyridyl)carbamate, was obtained by treating the reaction mixture with decolorizing charcoal, filtering and evaporating the filtrate to dryness in vacuo. This basic ester was converted into its phosphoric acid addition salt as follows: To a solution of the basic ester (16.9 g.) in 50 ml. of absolute ethanol was added a solution of 7.4 g. of 85% phosphoric acid in 50 ml. of absolute ethanol. The resultant precipitated gum crystallized slowly. Several recrystallizations of this product from ethanol gave a purified product, 2-(2-methyl-1-piperidyl)ethyl N-(3-pyridyl)carbamate diphosphate, M.P. 153.6–154.0° C. (corr.).

*Anal.*—Calcd. for $C_{14}H_{21}N_2O_3.2H_3PO_4$: N, 9.15; $H_3PO_4$, 42.67. Found: N, 9.13; $H_3PO_4$, 42.40.

In the rat thermal radiation test [J. Pharmacol. Exptl. Therap. 84, 301 (1945)] 2-(2-methyl-1-piperidyl)ethyl N-(3-pyridyl) carbamate diphosphate was found to be about two times more active than aminopyrine as an analgesic. The acute intravenous toxicity in mice of this compound was approximately 150 mg. per kg. ($ALD_{50}$) and the acute oral $ALD_{50}$ in mice was 670 mg. per kg.

EXAMPLE 3

*3-diethylaminopropyl N-(2-pyridyl)carbamate*

This compound was prepared following the procedure described above for Example 1 using 16.6 g. of ethyl N-(2-pyridyl)carbamate, 14.5 g. of 3-diethylaminopropanol and 200 ml. of dry xylene. The product, 3-diethylaminopropyl N-(2-pyridyl)carbamate, in the form of its dihydrochloride melted at 177.0–177.4° C. (corr.) when recrystallized from absolute ethanol.

*Anal.*—Calcd. for $C_{13}H_{21}N_3O_2.2HCl$: N, 12.95; Cl, 21.89. Found: N, 13.17; Cl, 21.67.

The acute intravenous toxicity in mice of 3-diethylaminopropyl N-(2-pyridyl)carbamate dihydrochloride was approximately 85 mg. per kg. ($ALD_{50}$).

EXAMPLE 4

*2-dimethylaminoethyl N-(2-pyridyl)carbamate*

Following the procedure described above for Example I but using 16.6 g. of ethyl N-(2-pyridyl)carbamate, 9.8 g. of 2-dimethylaminoethanol and 200 ml. of dry xylene, there was obtained the product, 2-dimethylaminoethyl N-(2-pyridyl)carbamate, which melted at 91.8–92.6° C. (corr.) when recrystallized several times from isopropanol.

*Anal.*—Calcd. for $C_{10}H_{15}N_3O_2$: C, 57.40; H, 7.23; N, 20.08. Found: C, 57.25; H, 7.19; N, 19.87.

This compound was found to be approximately as active as aminopyrine when tested in aqueous solution as its dihydrochloride salt by the rat thermal radiation test for analgesic activity.

EXAMPLE 5

*2-dimethylaminoethyl N-(3-pyridyl)carbamate*

This compound was prepared following the procedure described for Example 1 but using 16.6 g. of ethyl N-(3-pyridyl)carbamate, 10.7 g. of 2-dimethylaminoethanol and 200 ml. of dry xylene. The product, 2-dimethylaminoethyl N-(3-pyridyl)carbamate, in the form of its dihydrochloride, melted at 186.0–188.2° C. (corr.) when recrystallized from absolute ethanol.

Anal.—Calcd. for $C_{10}H_{15}N_3O_2 \cdot 2HCl$: N, 14.89; Cl, 25.13. Found: N, 14.95; Cl, 25.39.

EXAMPLE 6

*2-(2-methyl-1-piperidyl)ethyl N-(2-pyridyl)carbamate*

Following the procedure described for Example 1 but using 16.6 g. of ethyl N-(2-pyridyl)carbamate, 15.8 g. of 2-(2-methyl-1-piperidyl)ethanol and 200 ml. of dry xylene, there was obtained 2-(2-methyl-1-piperidyl)ethyl N-(2-pyridyl)carbamate, which in the form of its dihydrochloride melted at 200.4–201.0° C. (corr.), with decomposition, when recrystallized from absolute ethanol.

Anal.—Calcd. for $C_{14}H_{21}N_3O_2 \cdot 2HCl$: N, 12.50; Cl, 21.09. Found: N, 12.65; Cl, 21.04.

In the rat thermal radiation test for analgesic activity 2-(2-methyl-1-piperidyl)ethyl N-(2-pyridyl)carbamate dihydrochloride was found to be about one-half as active as aminopyrine. This compound was found to have an acute intravenous toxicity in mice of approximately 55 mg. per kg. ($ALD_{50}$).

EXAMPLE 7

*3-diethylaminopropyl N-(3-pyridyl)carbamate*

This compound was prepared following the procedure described above for Example 2 but using 12.2 g. of methyl N-(3-pyridyl)carbamate, 11.8 g. of 3-diethylaminopropanol and 200 ml. of dry xylene. The product, 3-diethylaminopropyl N-(3-pyridyl)carbamate, in the form of its diphosphate melted at 146.2–147.0° C. (corr.).

Anal.—Calcd. for $C_{13}H_{21}N_3O_2 \cdot 2H_3PO_4$: N, 9.37; $H_3PO_4$, 43.81. Found: N, 9.07; $H_3PO_4$, 43.70.

In the rat thermal radiation test for analgesic activity 3-diethylaminopropyl N-(3-pyridyl)carbamate diphosphate was found to be approximately one-half as active as aminopyrine.

EXAMPLE 8

*2-dimethylaminoethyl N-(2-pyridyl)carbamate methiodide*

To a solution of 5.0 g. of 2-dimethylaminoethyl N-(2-pyridyl)carbamate in 100 ml. of warm ethyl acetate was added 15 ml. of methyl iodide, whereupon the mixture rapidly set to a crystalline mass. The crystals were collected and washed thoroughly with ethyl acetate. The crystalline material was recrystallized once from methanol-isopropanol and once from aqueous isopropanol, resulting in 6.17 g. of 2-dimethylaminoethyl N-(2-pyridyl)carbamate methiodide, M.P. 231.2–231.8° C. (corr.), with decomposition.

Anal.—Calcd. for $C_{11}H_{18}IN_3O$: C, 37.63; H, 5.17; I, 36.14. Found: C, 37.31; H, 5.04; I, 36.0.

2-dimethylaminoethyl N-(2-pyridyl)carbamate methiodide was found to have an acute intravenous toxicity in mice of approximately 44 mg. per kg. ($ALD_{50}$).

Other quaternary ammonium salts of tertiary-aminoalkyl N-(pyridyl)carbamates that can be prepared according to the above procedure used to prepare 2-dimethylaminoethyl N-(2-pyridyl)carbamate methiodide using the appropriate tertiary-aminoalkyl N-(pyridyl)carbamate and lower-alkyl, lower-alkenyl or benzyl ester include the following: 2-diethylaminoethyl N-(4-pyridyl)carbamate methosulfate; 2-(2,5-dimethyl-1-pyrrolidyl)ethyl N-(2-pyridyl)carbamate methobenzenesulfonate; 2-(di-n-butylamino)ethyl N-(4-pyridyl)carbamate allobromide; 2-diethylamino-1-propyl N-(2-pyridyl)carbamate isobutiodide; and the like.

EXAMPLE 9

*2-dimethylaminoethyl N-(2-pyridyl)carbamate methobromide*

A solution of 5.0 g. of 2-dimethylaminoethyl N-(2-pyridyl)carbamate in 100 ml. of ethyl acetate was treated with a rapid stream of methyl bromide for forty-five minutes. After standing at room temperature for two hours, the mixture was filtered and the crystalline precipitate was recrystallized three times from ethanol-isopropanol. There was thus obtained 5.33 g. of 2-dimethylaminoethyl N-(2-pyridyl)carbamate methobromide, M.P. 220.2–221.4° C. (corr.), with decomposition.

Anal.—Calcd. for $C_{11}H_{18}BrN_3O_2$: C, 43.43; H, 5.97; Br, 26.27. Found: C, 43.31; H, 6.37; Br, 25.5.

2-dimethylaminoethyl N-(2-pyridyl)carbamate methobromide was found to have an acute intravenous toxicity in mice of about 42 mg. per kg. ($ALD_{50}$).

EXAMPLE 10

*2-dimethylaminoethyl N-(2-pyridyl)carbamate benzochloride*

A mixture of 4 g. of 2-dimethylaminoethyl N-(2-pyridyl)carbamate in 100 ml. of ethyl acetate and 15 ml. of benzyl chloride was refluxed for four hours and allowed to stand for about sixteen hours. The precipitate was collected, washed with ethyl acetate and recrystallized twice from isopropanol-ethyl acetate to yield the product, 2-dimethylaminoethyl N-(2-pyridyl)carbamate benzochloride, M.P. 188.2–192.6° C. (corr.).

Anal.—Calcd. for $C_{17}H_{22}ClN_3O_2$: N, 12.51; Cl, 10.56. Found: N, 12.36; Cl, 10.37.

2-dimethylaminoethyl N-(2-pyridyl)carbamate benzochloride was found to have an acute intravenous toxicity in mice of approximately 31 mg. per kg. ($ALD_{50}$).

Other tertiary-aminoalkyl N-(pyridyl)carbamate quaternary ammonium salts that can be prepared according to the foregoing procedure are 2-diethylaminoethyl N-(4-pyridyl)carbamate para-nitrobenzochloride and 2-(2,5-dimethyl-1-pyrrolidyl)ethyl N-(2-pyridyl)carbamate meta-methoxybenzobromide.

EXAMPLE 11

*2-dimethylaminoethyl N-(3-pyridyl)carbamate dimethobromide*

A solution of 3.5 g. of 2-dimethylaminoethyl N-(3-pyridyl)carbamate in 100 ml. of 80% aqueous ethanol was treated with gaseous methyl bromide until a weight gain of 4 g. was noted. The mixture was stoppered and allowed to stand at room temperature for seventeen days. The clear solution was evaporated to dryness in vacuo; ethyl acetate was added; and the resulting mixture was evaporated to dryness in vacuo. The residual crystalline material was recrystallized once from ethanol-ethyl acetate and once from ethanol-isopropanol, yielding 3.93 g. of 2-dimethylaminoethyl N-(3-pyridyl)carbamate dimethobromide, M.P. 243.0° C. (corr.), with decomposition.

Anal.—Calcd. for $C_{12}H_{21}Br_2N_3O_2$: C, 36.11; H, 5.30; Br, 40.05. Found: C, 36.40; H, 5.59; Br, 39.6.

2-dimethylaminoethyl N-(3-pyridyl)carbamate dimethobromide when tested for ganglionic blocking activity by the procedure described by Lape and Hoppe [J. Pharmacol. & Exptl. Therap. 116, 453 (1956)] was found to be about one-seventh as active as hexamethonium bromide in blocking the sympathetic ganglia. This compound was found to have an acute intravenous toxicity in mice of approximately 60.0 mg. per kg. ($ALD_{50}$).

Other tertiary-aminoalkyl N-(pyridyl)carbamate quaternary ammonium salts that can be prepared according to the above procedure used to prepare 2-dimethylaminoethyl N-(3-pyridyl)carbamate dimethobromide using the appropriate basic ester and quaternizing agent include the following: 3-(1-piperidyl)propyl N-(3-pyridyl)carbamate di - (ortho-chlorobenzochloride); 4-dimethylaminobutyl N-(3-pyridyl)carbamate diallochloride; 2-(2,6-dimethyl-1-piperidyl)ethyl N-(3-pyridyl)carbamate dimethosulfate; 2-(1-pyrrolidyl)ethyl N-(3-pyridyl)carbamate di-(metho-para-toluenesulfonate); and the like.

EXAMPLE 12

*2-dimethylaminoethyl N-(2-pyridyl)carbamate isopropobromide*

A mixture of 5 g. of 2-dimethylaminoethyl N-(2-pyridyl)carbamate and 20 ml. of isopropyl bromide in 100 ml. of acetonitrile was refluxed for about ten hours, evaporated to dryness, and the residual material recrystallized from isopropanol, yielding the product, 2-dimethylaminoethyl N-(2-pyridyl)carbamate isopropobromide, M.P. 201–203° C. (corr.), with decomposition.

*Anal.*—Calcd. for $C_{13}H_{22}BrN_3O_2$: Br, 24.06; N, 12.65. Found: Br. 23.5; N, 12.28.

EXAMPLE 13

*2-dimethylaminoethyl N-(3-pyridyl)carbamate diisopropobromide*

A mixture containing 3.5 g. of 2-dimethylaminoethyl N-(3-pyridyl)carbamate, 75 ml. of acetonitrile and 15 ml. of isopropyl bromide was refluxed for eleven hours. The reaction mixture was then evaporated to dryness and the residual gummy material was first triturated with hot ethyl acetate and then dissolved in a small volume of isopropanol. The crystalline precipitate that separated was recrystallized from absolute ethanol-ethyl acetate, yielding the product, 2-dimethylaminoethyl N-(3-pyridyl)carbamate diisopropobromide, M.P. 214–216° C. (corr.), with decomposition.

*Anal.*—Calcd. for $C_{16}H_{29}Br_2N_3O_2$: N, 9.23; Br, 35.11. Found: N, 9.45; Br. 34.0.

EXAMPLE 14

*2-dimethylaminoethyl N-(2-pyridyl)carbamate ortho-chlorobenzochloride*

A mixture containing 3.5 g. of 2-dimethylaminoethyl N-(2-pyridyl)carbamate, 10 ml. of ortho-chlorobenzyl chloride and 75 ml. of ethyl acetate was allowed to stand at room temperature for twenty-four hours. The crystalline precipitate was collected, washed with ethyl acetate and recrystallized from isopropanol, yielding the product, 2-dimethylaminoethyl N-(2-pyridyl)carbamate 2-ortho-chlorobenzochloride, M.P. 180–182° C. (corr.), with decomposition.

*Anal.*—Calcd. for $C_{17}H_{21}Cl_2N_3O_2$: N, 11.35; Cl⁻, 9.58. Found: N, 10.86; Cl⁻, 9.53.

My tertiary-aminoalkyl N-(pyridyl)carbamates and their salts can be formulated in the manner conventional for pharmacodynamic agents. For example, they can be prepared for oral administration in solid form with the aid of a carrier. Thus, the compounds can be formulated in unit dosage form as tablets in combination with a suitable adjuvant such as one or more of the following: calcium carbonate, starch, gelatin, talc, magnesium stearate, acacia, and the like; or, alternatively, they can be employed in capsule form either alone or admixed with an adjuvant. Alternatively, the compounds can be formulated for oral administration as an aqueous suspension or solution, aqueous-alcohol solution, oil solution or oil-water emulsion, or for parenteral administration as an aqueous solution or aqueous-alcohol solution, in the same manner in which conventional medicinal substances are formulated. Also, they can be formulated as ointment or cream compositions for topical application, using adjuvants such as petrolatum, lanolin, mineral oil, white wax, wool fat, and the like.

I claim:

1. Compositions selected from the group consisting of: (a) esters having the formula

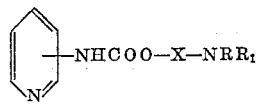

where X is a lower-alkylene radical having from two to four carbon atoms inclusive and having its two free valence bonds on different carbon atoms, and $NRR_1$ is a tertiary-amino radical selected from the group consisting of di-(lower-alkyl)amino, 1-piperidyl, (lower-alkylated)-1-piperidyl, 1-pyrrolidyl, (lower-alkylated)-1-pyrrolidyl and 4-morpholinyl; (b) their pharmacologically acceptable acid addition salts; and, (c) salts selected from the group consisting of their lower-alkyl, lower-alkenyl, and aralkyl pharmacologically acceptable quaternary ammonium salts.

2. Compositions having the formula

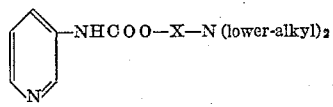

where X is a lower-alkylene radical having from two to four carbon atoms inclusive and having its two free valence bonds on different carbon atoms.

3. Compositions having the formula

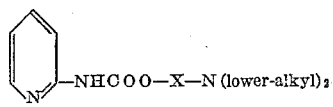

where X is a lower-alkylene radical having from two to four carbon atoms inclusive and having its two free valence bonds on different carbon atoms.

4. Compositions having the formula

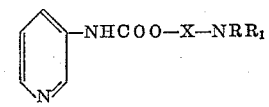

where X is a lower-alkylene radical having from two to four carbon atoms inclusive and having its two free valence bonds on different carbon atoms, and $NRR_1$ is a (lower-alkylated)-1-piperidyl radical.

5. A compound having the formula

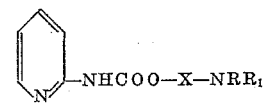

where X is a lower-alkylene radical having from two to four carbon atoms inclusive and having its two free valence bonds on different carbon atoms, and $NRR_1$ is a (lower-alkylated)-1-piperidyl radical.

References Cited in the file of this patent

UNITED STATES PATENTS

| | | |
|---|---|---|
| 1,396,913 | Bader | Nov. 15, 1921 |
| 2,199,839 | Renshaw et al. | May 7, 1940 |
| 2,700,039 | Ehrhart et al. | Jan. 18, 1955 |